(12) United States Patent
Fukiage

(10) Patent No.: US 11,997,236 B2
(45) Date of Patent: May 28, 2024

(54) PRINTING SYSTEM AND SERVER

(71) Applicant: SEIKO EPSON CORPORATION, Tokyo (JP)

(72) Inventor: Masaki Fukiage, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/938,365

(22) Filed: Oct. 6, 2022

(65) Prior Publication Data
US 2023/0106049 A1 Apr. 6, 2023

(51) Int. Cl.
*H04N 1/00* (2006.01)
*G10L 15/22* (2006.01)

(52) U.S. Cl.
CPC ......... *H04N 1/00403* (2013.01); *G10L 15/22* (2013.01); *G10L 2015/223* (2013.01); *G10L 2015/228* (2013.01)

(58) Field of Classification Search
CPC ......... G10L 2015/228; G10L 2015/223; G10L 15/22; H04N 1/00403
See application file for complete search history.

(56) References Cited

U.S. PATENT DOCUMENTS

| 11,568,863 | B1* | 1/2023 | Sarikaya | .................. G10L 15/02 |
| 2015/0317109 | A1 | 11/2015 | Kirihata | |
| 2021/0104239 | A1* | 4/2021 | Miyazaki | ................ G10L 15/22 |
| 2022/0092269 | A1* | 3/2022 | Le | ........................... G06F 40/35 |

FOREIGN PATENT DOCUMENTS

JP 2015213256 A 11/2015

* cited by examiner

*Primary Examiner* — John R Wallace
(74) *Attorney, Agent, or Firm* — CHIP LAW GROUP

(57) ABSTRACT

A server of a printing system includes a print instruction acquisition unit acquiring a print instruction of a content contained in a content group by a voice from a voice mediation device, a selection unit selecting the content to be printed from the content group according to the print instruction, and a transmission unit transmitting print data for printing of the selected content to a printing apparatus of the printing system, wherein the content group contains a plurality of time-dependent contents having different probabilities for selection according to a time when the print instruction is acquired, the selection unit selects the content to be printed from the content group so that each of the plurality of time-dependent contents is selected with the probability according to the time when the print instruction is acquired. The printing apparatus receives the print data and executes printing according to the print data.

7 Claims, 10 Drawing Sheets

FIG. 3

MEMORY DEVICE 104

CONTENT GROUP G1 (DESIGN PAPER)

| SPRING CONTENT A | SPRING CONTENT B | SPRING CONTENT C |
|---|---|---|
| SUMMER CONTENT A | SUMMER CONTENT B | SUMMER CONTENT C |
| FALL CONTENT A | FALL CONTENT B | FALL CONTENT C |
| WINTER CONTENT A | WINTER CONTENT B | WINTER CONTENT C |
| NEUTRAL CONTENT A | NEUTRAL CONTENT B | NEUTRAL CONTENT C |

CONTENT GROUP G1 (RECIPE)

| SPRING CONTENT D | SPRING CONTENT E | SPRING CONTENT F |
|---|---|---|
| SUMMER CONTENT D | SUMMER CONTENT E | SUMMER CONTENT F |
| FALL CONTENT D | FALL CONTENT E | FALL CONTENT F |
| WINTER CONTENT D | WINTER CONTENT E | WINTER CONTENT F |
| NEUTRAL CONTENT D | NEUTRAL CONTENT E | NEUTRAL CONTENT F |

WEIGHT TABLE TA1

|  | Mar to May | June to Aug | Sept to Nov | Dec to Feb |
|---|---|---|---|---|
| SPRING CONTENT | 5 | 0.2 | 0.2 | 0.2 |
| SUMMER CONTENT | 0.2 | 5 | 0.2 | 0.2 |
| FALL CONTENT | 0.2 | 0.2 | 5 | 0.2 |
| WINTER CONTENT | 0.2 | 0.2 | 0.2 | 5 |
| NEUTRAL CONTENT | 1 | 1 | 1 | 1 |

FIG. 5

SELECTION PROBABILITY SR

|  | Mar to May | June to Aug | Sept to Nov | Dec to Feb |
|---|---|---|---|---|
| SPRING CONTENT | SR1: $\frac{5}{6.6}$ | SR2: $\frac{0.2}{6.6}$ | SR2: $\frac{0.2}{6.6}$ | SR2: $\frac{0.2}{6.6}$ |
| SUMMER CONTENT | SR2: $\frac{0.2}{6.6}$ | SR1: $\frac{5}{6.6}$ | SR2: $\frac{0.2}{6.6}$ | SR2: $\frac{0.2}{6.6}$ |
| FALL CONTENT | SR2: $\frac{0.2}{6.6}$ | SR2: $\frac{0.2}{6.6}$ | SR1: $\frac{5}{6.6}$ | SR2: $\frac{0.2}{6.6}$ |
| WINTER CONTENT | SR2: $\frac{0.2}{6.6}$ | SR2: $\frac{0.2}{6.6}$ | SR2: $\frac{0.2}{6.6}$ | SR1: $\frac{5}{6.6}$ |
| NEUTRAL CONTENT | SR3: $\frac{1}{6.6}$ | SR3: $\frac{1}{6.6}$ | SR3: $\frac{1}{6.6}$ | SR3: $\frac{1}{6.6}$ |

PRINTING SYSTEM AND SERVER

The present application is based on, and claims priority from JP Application Serial Number 2021-164645, filed Oct. 6, 2021, the disclosure of which is hereby incorporated by reference herein in its entirety.

BACKGROUND

1. Technical Field

The present disclosure relates to a printing system including a printing apparatus and a server, and a server.

2. Related Art

Recently, printers have been controlled to execute printing via server computers providing cloud printing services.

Further, recently, smart speakers in cooperation with voice recognition services on clouds have been commercially available.

As a reference, JP-A-2015-213256 shows a printing system in which an image forming apparatus and a client PC are coupled via a LAN. It is necessary for a voice user of the printing system to first input print data from the client PC to the image forming apparatus, and then, go to the location of the image forming apparatus. In addition, the user may hear voices indicating printing start, function selection, or the like from the image forming apparatus and control the image forming apparatus to perform a specific function of copy, box, or the like by voices.

The above described technique does not support a voice instruction for printing to the client PC.

Particularly, when the commercially available smart speaker is used for printing, the user designates a content to be printed by a voice. When a plurality of contents are prepared, but do not have proper names specifying the respective contents, the server randomly may select the content to be printed from the plurality of contents and control the printer to execute printing. In this case, the content not appropriate to the time of the print instruction may be printed.

SUMMARY

A printing system according to an aspect of the present disclosure is a printing system including a printing apparatus, and a server coupled to the printing apparatus via a network, the server includes a print instruction acquisition unit acquiring a print instruction of a content contained in a content group by a voice from a voice mediation device, a selection unit selecting the content to be printed from the content group according to the print instruction, and a transmission unit transmitting print data for printing of the selected content to the printing apparatus, wherein the content group contains a plurality of time-dependent contents having different probabilities for selection according to a time when the print instruction is acquired, the selection unit selects the content to be printed from the content group so that each of the plurality of time-dependent contents is selected with the probability according to the time when the print instruction is acquired, and the printing apparatus receives the print data and executes printing according to the print data.

A server according to an aspect of the present disclosure is a server coupled to a printing apparatus executing printing according to received print data via a network, including a print instruction acquisition unit acquiring a print instruction of a content contained in a content group by a voice from a voice mediation device, a selection unit selecting the content to be printed from the content group according to the print instruction, and a transmission unit transmitting print data for printing of the selected content to the printing apparatus, wherein the content group contains a plurality of time-dependent contents having different probabilities for selection according to a time when the print instruction is acquired, and the selection unit selects the content to be printed from the content group so that each of the plurality of time-dependent contents is selected with the probability according to the time when the print instruction is acquired.

BRIEF DESCRIPTION OF THE DRAWINGS

FIG. 3 schematically shows a structure example of content groups and a weight table stored in a memory device.

FIG. 5 schematically shows an example of selection probabilities according to times.

DESCRIPTION OF EXEMPLARY EMBODIMENTS

As below, embodiments of the present disclosure will be explained. Obviously, the following embodiments just exemplify the present disclosure, and all of the features shown in the embodiments are not necessarily essential for solving means of the present disclosure.

(1) OVERVIEW OF TECHNIQUE

First, the present application describes the overview of a technique with reference to the examples shown in FIGS. 1 to 10. Note that the drawings of the present application schematically show examples, and magnification factors in the respective directions shown in these drawings may be different and the respective drawings may be inconsistent with one another. Obviously, the respective elements of the technique are not limited to the specific examples shown by signs. In "Overview of Technique", notes in brackets refer to supplemental explanation of immediately preceding terms.

Embodiment 1

Figure 1:
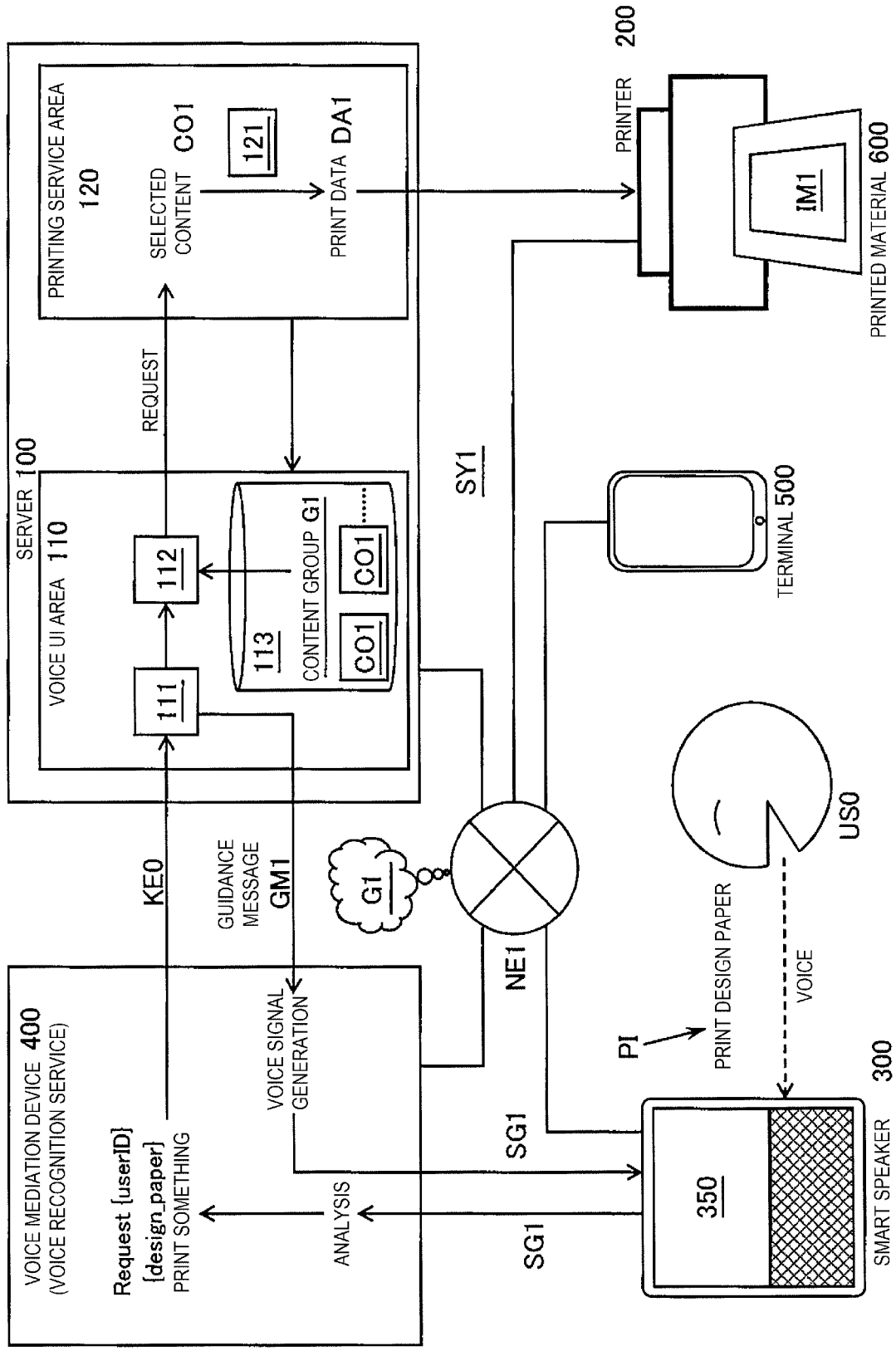
FIG. 1 is a block diagram schematically showing a configuration example of a system including a printing system.
Figure 2:
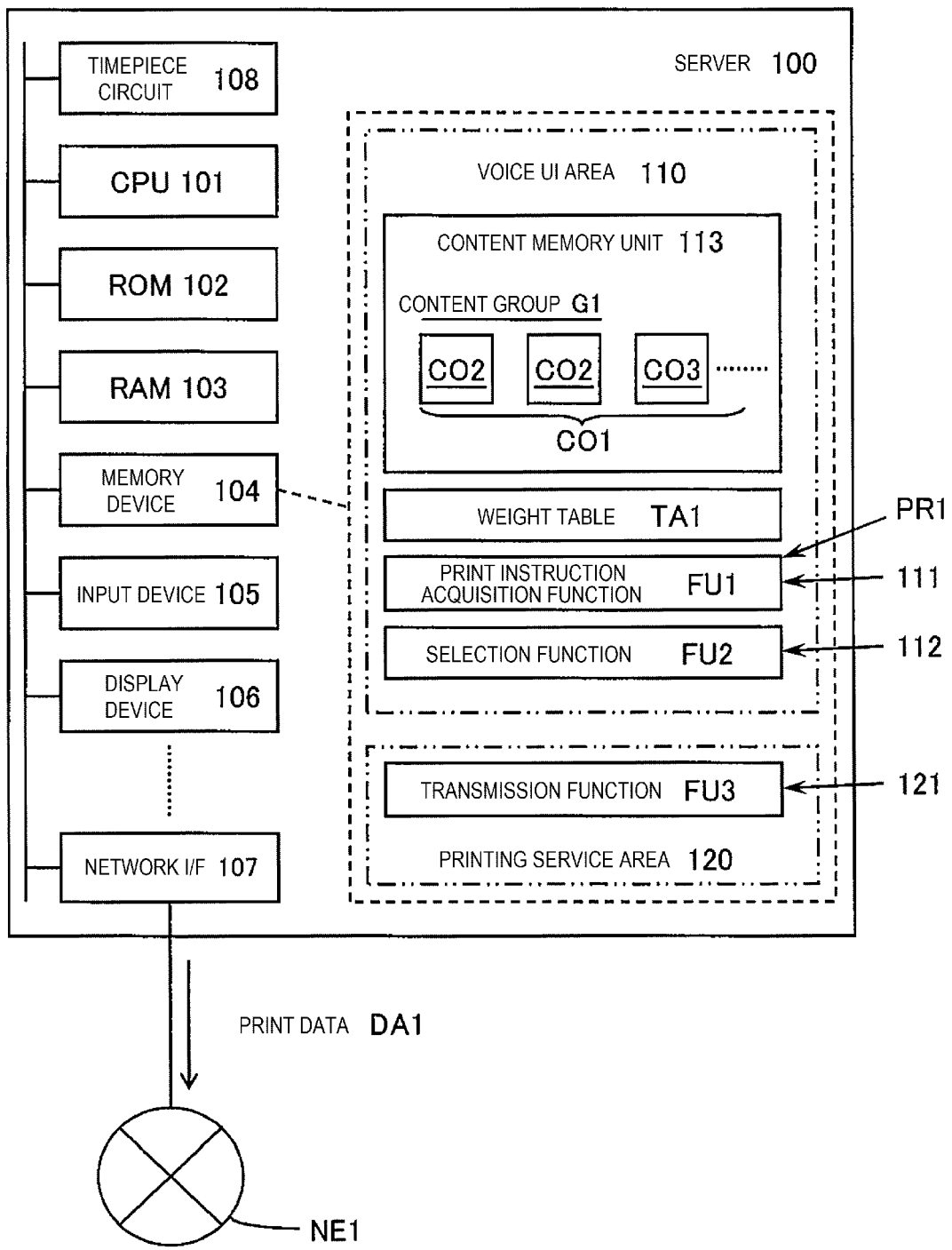
FIG. 2 is a block diagram schematically showing a configuration example of a server.
Figure 4:
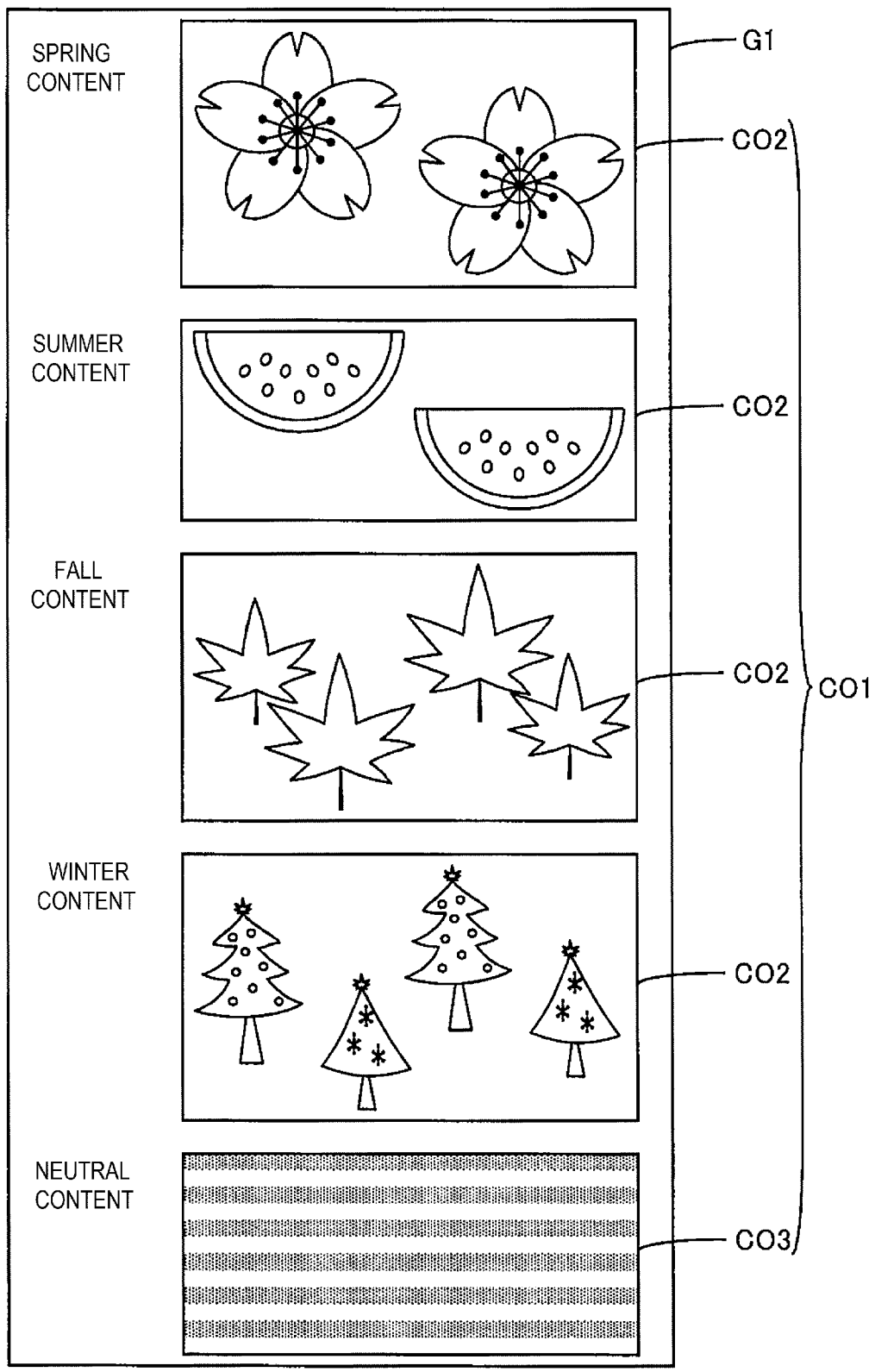
FIG. 4 schematically shows a specific example of time-dependent contents and a time-independent content.

As exemplified in FIG. 1 etc., a printing system SY1 according to one aspect of the technique includes a printing apparatus (e.g. a printer 200) and a server 100 coupled to the printing apparatus (200) via a network NE1. The server 100 includes a print instruction acquisition unit 111, a selection unit 112, and a transmission unit 121. The print instruction acquisition unit 111 acquires a print instruction PI of a content CO1 contained in a content group G1 by a voice from a voice mediation device 400. The selection unit 112 selects the content CO1 to be printed from the content group G1 according to the print instruction PI. The transmission unit 121 transmits print data DA1 for printing of the selected content CO1 to the printing apparatus (200). Here, as shown in FIGS. 2 to 4, the content group G1 contains a plurality of time-dependent contents CO2 having different probabilities for selection according to the times when the print instruction PI is acquired. The selection unit 112 selects the content CO1 to be printed from the content group G1 so that each of the respective plurality of time-dependent contents CO2 may be selected with the probability according to the time when the print instruction PI is acquired. The printing apparatus (200) receives the print data DA1 and executes printing according to the print data DA1.

In the above described embodiment 1, when the content CO1 is randomly selected and printed by the print instruction PI by a voice, the probability for selection of the content CO1 is changed according to the time when the print instruction PI is acquired. Therefore, the above described embodiment 1 may provide the printing system SY1 that increases usability.

Here, the server 100 refers to a computer providing data, and may be a single computer or a plurality of computers coupled to one another.

"First", "second", . . . in the present application are terms for identification of the respective component elements contained in the plurality of component elements having similarities and do not mean the order.

The above described remark is applied to the following embodiments.

Embodiment 2

As exemplified in FIG. 5, the plurality of time-dependent contents CO2 may have different probabilities for selection according to the seasons in which the print instruction PI is acquired as the times. The selection unit 112 may select the content CO1 to be printed from the content group G1 so that each of the respective plurality of time-dependent contents CO2 may be selected with the probability according to the season in which the print instruction PI is acquired. In the embodiment 2, the probability for selection of the content CO1 changes according to the season in which the print instruction PI by a voice is acquired, a preferable example increasing usability may be provided.

Embodiment 3

As exemplified in FIG. 5, the time-dependent contents CO2 may be associated to the corresponding time having a first probability SR1 as the probability. When the time when the print instruction PI is acquired is not the corresponding time, the probability that the time-dependent content CO2 is selected from the content group G1 may be a second probability SR2 lower than the first probability SR1.

For example, it is assumed that a spring content having spring as the corresponding time is prepared as the time-dependent content CO2. The first probability SR1 that the spring content is selected when the season in which the print instruction PI is acquired is spring is higher than the second probability SR2 that the spring content is selected when the season in which the print instruction PI is acquired is summer, fall, or winter. Further, it is assumed that a summer content having summer as the corresponding time is prepared as the time-dependent content CO2. The first probability SR1 that the summer content is selected when the season in which the print instruction PI is acquired is summer is higher than the second probability SR2 that the summer content is selected when the season in which the print instruction PI is acquired is spring, fall, or winter.

As exemplified above, in the embodiment 3, the probability that the time-dependent content CO2 is selected in the corresponding time is higher, and a preferable example increasing usability may be provided.

Embodiment 4

As exemplified in FIG. 5, the content group G1 may contain a time-independent content CO3 having the probability for selection unchanged depending on the time when the print instruction PI is acquired. The selection unit 112 may select the content CO1 to be printed from the content group G1 so that the time-independent content CO3 may be selected with the probability independent of the time when the print instruction PI is acquired.

As described above, the time-dependent content CO2 is selected with the probability according to the time when the print instruction PI is acquired, however, the time-independent content CO3 is selected with the probability independent of the time when the print instruction PI is acquired. Therefore, in the embodiment 4, the usability may be further increased.

Embodiment 5

Further, as exemplified in FIG. 5, the probability that the time-independent content CO3 is selected from the content group G1 (e.g. a third probability SR3) may be lower than the first probability SR1 and higher than the second probability SR2. In this case, the probability that the time-dependent content CO2 is selected in the corresponding time is higher than the probability that the time-independent content CO3 is selected and, the probability that the time-dependent content CO2 is selected in another time than the corresponding time is lower than the probability that the time-independent content CO3 is selected. Therefore, in the embodiment 5, a preferable example increasing usability may be provided.

Embodiment 6

Figure 10:
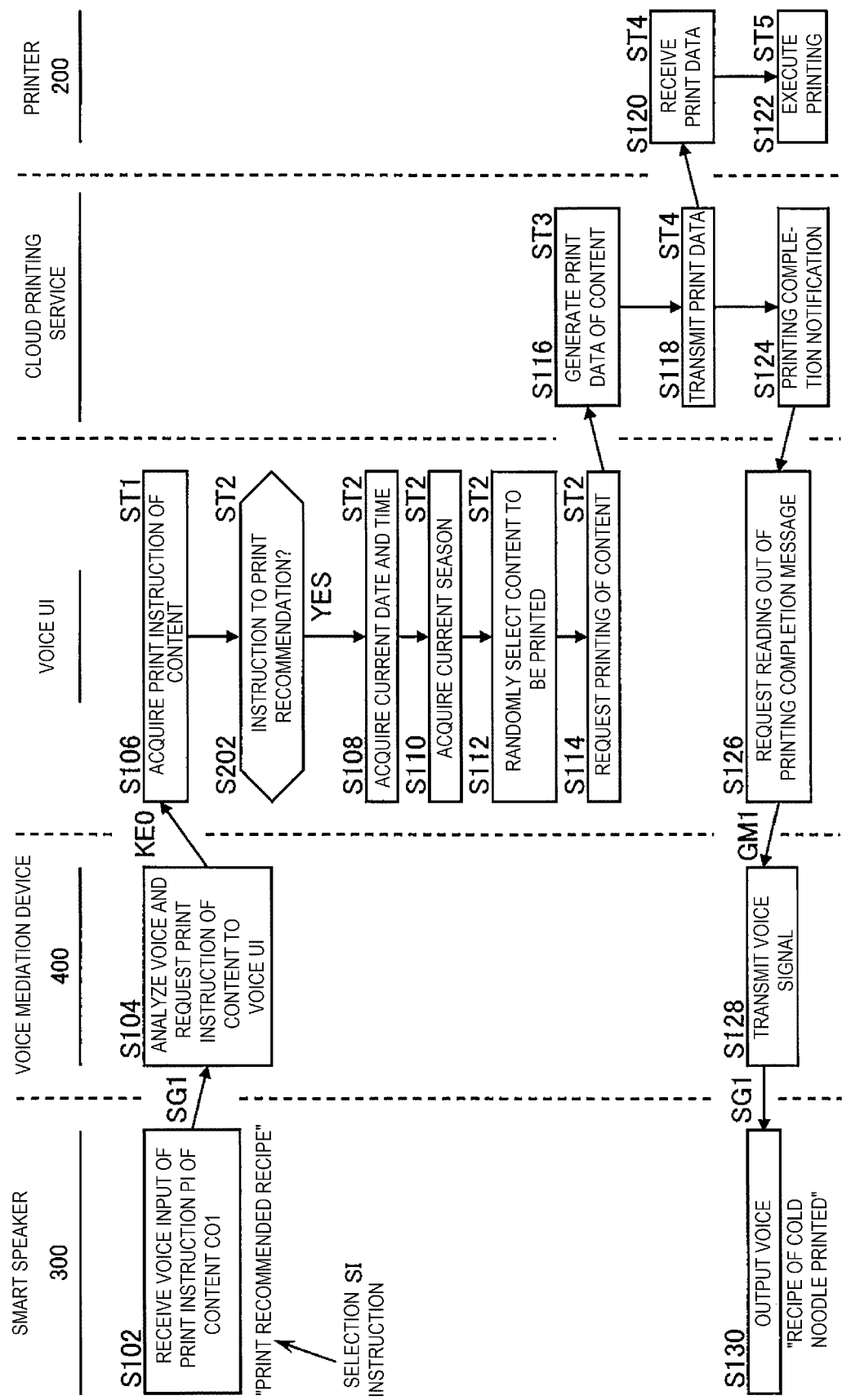
FIG. 10 schematically shows an example of processing of printing a recommended content by voice input.

As exemplified in FIG. 10, the print instruction PI may contain a selection instruction SI for the selection unit 112 to select the time-dependent content CO2 with the probability according to the time when the print instruction PI is acquired. When the print instruction acquisition unit 111 acquires the print instruction PI containing the selection instruction SI, the selection unit 112 may select the content CO1 to be printed from the content group G1 so that each of the respective plurality of time-dependent contents CO2 may be selected with the probability according to the time when the print instruction PI is acquired.

In the above described case, by the print instruction PI containing the selection instruction SI to select the time-dependent content CO2 with the probability according to the time when the print instruction PI is acquired, the probability for selection of the content CO1 changes depending on the time when the print instruction PI is acquired. Therefore, in the embodiment 6, usability may be further increased.

Embodiment 7

As exemplified in FIG. 1 etc., the server 100 may further include a content memory unit 113 storing the content group G1. In the embodiment 7, a preferable example for selecting the content CO1 to be printed from the content group G1 may be provided.

Embodiment 8

The server 100 according to an aspect of the technique is the server 100 coupled to the printing apparatus (200) executing printing according to the received print data DA1 via the network NE1, including the print instruction acquisition unit 111, the selection unit 112, and the transmission unit 121. The print instruction acquisition unit 111 acquires the print instruction PI of the content CO1 contained in the content group G1 by a voice from the voice mediation device 400. The selection unit 112 selects the content CO1 to be printed from the content group G1 according to the print instruction PI. The transmission unit 121 transmits the print data DA1 for printing of the selected content CO1 to the printing apparatus (200). Here, the content group G1 contains the plurality of time-dependent contents CO2 having different probabilities for selection according to the times when the print instruction PI is acquired. The selection unit 112 selects the content CO1 to be printed from the content group G1 so that each of the respective plurality of time-dependent contents CO2 may be selected with the probability according to the time when the print instruction PI is acquired. Therefore, in the embodiment 8, the server 100 for increasing usability may be provided.

Note that the embodiments 2 to 7 can be added to the embodiment 8.

Further, the technique can be applied to a complex system including the above described printing system SY1, a complex apparatus including the above described server 100, a printing method performed in the above described printing system SY1, a printing control method performed in the above described server 100, a printing program for controlling a computer to realize functions corresponding to the respective units of the above described printing system SY1, a printing control program PR1 for controlling a computer to realize functions corresponding to the respective units of the above described server 100, a computer-readable medium in which the above described program is recorded, or the like.

(2) SPECIFIC EXAMPLE OF CONFIGURATION OF PRINTING SYSTEM SY1

FIG. 1 schematically shows a specific example of a configuration of a system including the printing system SY1. The system includes the server 100, the printer 200, a smart speaker 300, and the voice mediation device 400, and may include a terminal 500. The printing system SY1 includes the server 100 and the printer 200. A user US0 may directly operate the printer 200, the smart speaker 300, and the terminal 500. The server 100, the printer 200, the smart speaker 300, the voice mediation device 400, and the terminal 500 are coupled to the network NE1 including the Internet. The network NE1 including the Internet may include a LAN. Here, the LAN is an abbreviation for Local Area Network. The coupling to the network NE1 may be wired connection, wireless connection, or wired and wireless connection. The server 100 is a server computer providing a function of cloud printing service and releases a function called a voice UI to the voice mediation device 400.

Here, UI is an abbreviation for user interface. When the content CO1 is printed, the server 100 transmits the print data DA1 based on a keyword KE0 from the voice mediation device 400 to the printer 200. The printer 200 is a printing apparatus forming a print image IM1 according to the print data DA1 from the server 100. The smart speaker 300 is a voice input-output device using a function called a voice recognition service by the voice mediation device 400. The voice mediation device 400 is a server computer providing the voice recognition service using AI. Here, AI is an abbreviation for artificial intelligence.

In the following description, "voice UI" refers to a unit that fulfills the function as the voice UI of the server 100 and "cloud printing service" refers to a unit that fulfills the function as the cloud printing service of the server 100. The keyword KE0 may be a word collectively handled when an object to be printed is specified and may be a phrase or a paragraph, not limited to a single word.

The server 100 has a voice UI area 110 as a memory area for information for realization of the voice UI and a printing service area 120 as a memory area for information for realization of a cloud printing service. The voice UI is a service constructed on a platform of the voice recognition service by a provider of the cloud printing service. The voice UI area 110 contains an information area for realization of the print instruction acquisition unit 111, the selection unit 112, and the content memory unit 113. The content memory unit 113 stores the content group G1 containing a plurality of the contents CO1. Note that the content group G1 is not limited to that stored in the content memory unit 113. At least a part of the content group G1 may be stored in the printing service area 120 or stored in another server computer than the server 100. The printing service area 120 contains an information area for realization of the transmission unit 121. The server 100 executes a plurality of pieces of processing for realizing the voice UI and the cloud printing service in parallel. Note that the voice UI and the cloud printing service may be constructed by separate computers. Alternatively, the voice UI may be constructed by a server computer providing the voice recognition service.

For example, when the user US0 makes a speech "print design paper", the smart speaker 300 converts the voice from the user US0 into a digital voice signal SG1 and transmits the voice signal SG1 to the voice mediation device 400 via the network NE1. In this case, "print design paper" is the print instruction PI of the content CO1 contained in the content group G1 by a voice. The voice mediation device 400 receiving the voice signal SG1 acquires identification information of the user US0, analyzes the voice based on the voice signal SG1, when the voice contains a print request keyword "print something", requests printing to the voice UI, and transmits the identification information of the user US0 and the keyword KE0 as "design paper" contained in the voice to the voice UI. The voice mediation device 400 may receive smart speaker identification information 300id exemplified in FIG. 7 from the smart speaker 300 and acquire the identification information of the user US0 connected to the smart speaker identification information 300id. Further, the voice mediation device 400 may identify the user US0 based on the voice signal SG1 and acquire the identification information of the identified user US0. Of "print Request {user ID} {design_paper}", "{user ID}" refers to the identification information of the user US0 and "{design_paper}" refers to a keyword such as "design paper". The voice UI receiving the identification information and the keyword KE0 with the print request keyword performs processing according to the keyword KE0. Here, it is difficult to specify the type because the design paper has many variations and no proper names. Accordingly, the voice UI randomly selects the content CO1 and transmits the print request for the selected content CO1 to the cloud printing service.

The cloud printing service receiving the print request generates the print data DA1 using the content CO1 and transmits the print data DA1 to the printer 200 associated to the identification information of the user US0 via the network NE1. The printer 200 receiving the print data DA1 executes printing according to the print data DA1 and forms a printed material 600 having the print image IM1 based on the print data DA1. Thereby, the content CO1 of "design paper" of the speech by the user US0 is printed. Note that, not only the object to be printed by the keyword KE0 but also the printer 200 assumed as the output destination by the user US0 may be designated by a speech "print design paper by printer of company A" or the like.

Obviously, the print request keyword is not limited to "print something", but includes similar variations such as "perform printing of something". Accordingly, processing on the voice containing these variations may be processing similar to the processing on the voice containing the print request keyword "print something".

Further, the voice UI also performs processing of transmitting a guidance message GM1 such as "design paper printed" to the voice mediation device 400. The voice mediation device 400 receiving the guidance message GM1 converts the guidance message GM1 into the digital voice signal SG1 and transmits the voice signal SG1 to the smart speaker 300 via the network NE1. The smart speaker 300 receiving the voice signal SG1 converts the voice signal SG1 into a voice and outputs the voice such as "design paper printed".

FIG. 2 schematically exemplifies the configuration of the server 100. The server 100 shown in FIG. 2 is a single server computer having the voice UI area 110 and the printing service area 120, however, the server 100 may be formed using a plurality of server computers coupled to one another. For example, the server 100 may have a configuration in which a server computer having the voice UI area 110 and a server computer having the printing service area 120 are separately provided. Alternatively, the voice UI area 110 may be constructed in a server computer providing the voice recognition service and, also, in this case, the server 100 including the voice UI area 110 and the printing service area 120 is formed.

The server 100 shown in FIG. 2 includes a CPU 101 as a processor, a ROM 102 as a semiconductor memory, a RAM 103 as a semiconductor memory, a memory device 104, an input device 105, a display device 103, a network I/F 107, a timepiece circuit 108, etc. These elements are electrically coupled and can input and output information to and from one another. Here, CPU is an abbreviation for Central Processing Unit, ROM is an abbreviation for Read Only Memory, RAM is an abbreviation for Random Access Memory, and I/F is an abbreviation for interface.

The memory device 104 stores an OS (not shown) etc. and has the above described voice UI area 110 and printing service area 120. Here, the OS is an abbreviation for operating system. The voice UI area 110 has the content memory unit 113 and a weight table TA1 and stores a program for the server 100 to realize a print instruction acquisition function FU1 and a selection function FU2 etc. The details will be described later. The content memory unit 113 stores the content group G1 containing the time-dependent content CO2 and the time-independent content CO3 as a plurality of contents CO1. The weight table TA1 has weights of probabilities that the respective contents CO1 are selected from the content group G1. The printing service area 120 stores a program for the server 100 to realize a transmission function FU3 etc. The printing control program PR1 contains a program for the server 100 to realize the print instruction acquisition function FU1, the selection function FU2, and the transmission function FU3. The information stored in the memory device 104 is appropriately read out into the RAM 103 and used for processing for the printer 200 to execute printing. As the memory device 104, a magnetic storage device such as a hard disc, a nonvolatile semiconductor memory such as a flash memory, or the like may be used. Note that the printing control program PR1 is a print app from the viewpoint of the user US0.

As the input device 105, a pointing device, hard keys including a keyboard, a touch panel attached to the surface of a display panel, or the like may be used. As the display device 106, a liquid crystal display panel or the like may be used. The network I/F 107 is connected to the network NE1 and communicates with another device connected to the network NE1 according to a predetermined communication standard. The transmission unit 121 transmits the print data DA1 from the network I/F 107 to the printer 200. The timepiece circuit 108 can output the current date and time.

The CPU 101 executes the printing control program PR1 read out from the memory device 104 into the RAM 103, and thereby, performs print instruction acquisition processing corresponding to the print instruction acquisition function FU1, selection processing corresponding to the selection function FU2, and print data transmission processing corresponding to the transmission function FU3. The printing control program PR1 controls the server 100 as the computer to function as the print instruction acquisition unit 111 corresponding to the print instruction acquisition function FU1, the selection unit 112 corresponding to the selection function FU2, and the transmission unit 121 corresponding to the transmission function FU3. The server 100 executing the printing control program PR1 performs a print instruction acquisition step ST1, a selection step ST2, a print data generation step ST3, a print data transmission step ST4, and a printing step ST5 as exemplified in FIG. 8 etc. The computer-readable medium storing the printing control program PR1 is not limited to the memory device 104, but may be a recording medium outside of the server 100.

FIG. 3 schematically exemplifies structures of the content groups G1 and the weight table stored in the memory device 104. Note that the content memory unit 113 of the memory device 104 stores the content groups G1. FIG. 4 schematically shows a specific example of the contents C1 in design paper.

FIG. 3 shows the content group G1 of design paper and the content group G1 of recipes. Obviously, the content memory unit 113 may store a content group of scrapbooking or the like. Each content group G1 contains a plurality of contents CO1. The plurality of contents CO1 in the design paper and the recipes contain a plurality of time-dependent contents CO2 and a plurality of time-independent contents CO3. The time-dependent content CO2 is a content suitable for a certain time. The plurality of time-dependent contents CO2 in the design paper and the recipes are prepared for seasons of spring, summer, fall, and winter, and contain spring contents having spring as corresponding times, summer contents having summer as corresponding times, fall contents having fall as corresponding times, and winter contents having winter as corresponding times. In the design paper shown in FIG. 3, the spring contents contain a spring content A, a spring content B, and a spring content C, the summer contents contain a summer content A, a summer content B, and a summer content C, the fall contents contain a fall content A, a fall content B, and a fall content C, and the winter contents contain a winter content A, a winter content B, and a winter content C. Obviously, the number of time-dependent contents CO2 is not limited to the number shown in FIG. 3. As shown in FIG. 4, the spring content has a pattern recalling spring such as a pattern of a flower blooming in spring. The summer content has a pattern recalling summer such as a food harvested in summer. The fall content has a pattern recalling fall such as a plant seen in fall. The winter content has a pattern recalling winter such as a Christmas tree seen in winter.

Though not shown in the drawings, regarding the plurality of contents CO1 of recipes, for example, a recipe of a cold food such as cold noodle may be assigned to the summer content and a recipe of a hot food such as a hot pot may be assigned to the winter content.

In comparison to the time-dependent contents CO2, the time-independent contents CO3 are contents suitable for use throughout a year and shown as neutral contents in FIG. 3. For example, in the design paper shown in FIG. 3, the neutral contents contain a neutral content A, a neutral content B, and a neutral content C. Obviously, the number of time-independent contents CO3 is not limited to the number shown in FIG. 3. As shown in FIG. 4, the neutral content has a pattern independent of the season such as a striped pattern.

As described above, the design paper has many variations and no proper names, and are randomly printed. Here, if a spring content is printed in the other season than spring or a summer content is printed in the other season than summer, it is highly likely that the printed material does not suite the user's taste. On the other hand, if only the spring contents are printed in spring or only the summer contents are printed in summer, the number of types of contents that the user US0 can obtain as the printed material 600 in the time when the print instruction PI is acquired may be smaller.

Accordingly, in the specific example, the selection probabilities of the time-dependent contents CO2 are changed according to the time when the print instruction PI is acquired according to the weight table TA1 shown in FIG. 3.

In the weight table TA1 shown in FIG. 3, weights of probabilities that the respective contents CO1 are selected from the content group G1 are set according to the characteristics of the time-dependent contents CO2 and the time-independent contents CO3. Here, spring is from March to May, summer is from June to August, fall is from September to November, and winter is from December to February. Obviously, the change of the seasons is the change of the months as an example. The change of the seasons may be in the middle of the month. Further, the number of months for each season may not be three. For example, the spring contents have larger weights "5" in March to May and smaller weights "0.2" in the other times. The summer contents have larger weights "5" in June to August and smaller weights "0.2" in the other times. The fall contents have larger weights "5" in September to November and smaller weights "0.2" in the other times. The winter contents have larger weights "5" in December to February and smaller weights "0.2" in the other times. On the other hand, the neutral contents have the constant weights "1" throughout a year.

FIG. 5 schematically exemplifies selection probabilities SR as probabilities that a plurality of types of time-dependent contents CO2 and time-independent contents CO3 are selected according to the season in which the print instruction PI is acquired. The example in FIG. 5 shows the selection probabilities SR according to the weight table TA1 shown in FIG. 3 when the content group G1 contains the same numbers of spring contents, summer contents, fall contents, winter contents, and neutral contents.

For example, the selection probabilities SR of the spring contents include a first probability SR1 "5/6.6" as the probability in March to May, the corresponding time, and second probabilities SR2 "0.2/6.6" as the probabilities in June to August, September to November, December to February, not the corresponding time. The selection probabilities SR of the summer contents include a first probability SR1 "5/6.6" as the probability in June to August, the corresponding time, and second probabilities SR2 "0.2/6.6" as the probabilities in March to May, September to November, December to February, not the corresponding time. The selection probabilities SR of the fall contents include a first probability SR1 "5/6.6" as the probability in September to November, the corresponding time, and second probabilities SR2 "0.2/6.6" as the probabilities in March to May, June to August, December to February, not the corresponding time. The selection probabilities SR of the winter contents include a first probability SR1 "5/6.6" as the probability in December to February, the corresponding time, and second probabilities SR2 "0.2/6.6" as the probabilities in March to May, June to August, September to November, not the corresponding time.

As described above, the respective time-dependent contents CO2 have the different selection probabilities SR dependent on the seasons in which the print instruction PI is acquired and are associated to the corresponding times when the selection probabilities SR are the first probabilities SR1. In the respective time-dependent contents CO2, the first probabilities SR1 in the corresponding times are higher than the second probabilities SR2 in the non-corresponding times.

Third probabilities SR3 as the selection probabilities SR of the neutral contents are "1/6.6" in all of March to May, June to August, September to November, and December to February. Therefore, the time-independent contents CO3 have probabilities for selection unchanged depending on the seasons in which the print instruction PI is acquired. The third probabilities SR3 as the selection probabilities SR of the time-independent contents CO3 are lower than the first probabilities SR1 of the time-dependent contents CO2 in the corresponding times and higher than the second probabilities SR2 of the time-dependent contents CO2 in the non-corresponding times.

Note that, when the numbers of the spring contents, the summer contents, the fall contents, and the winter contents existing in the content group G1 are biased, the weighs stored in the weight table TA1 are adjusted, and thereby, the third probabilities SR3 may be kept constant independent of the seasons.

Figure 6:
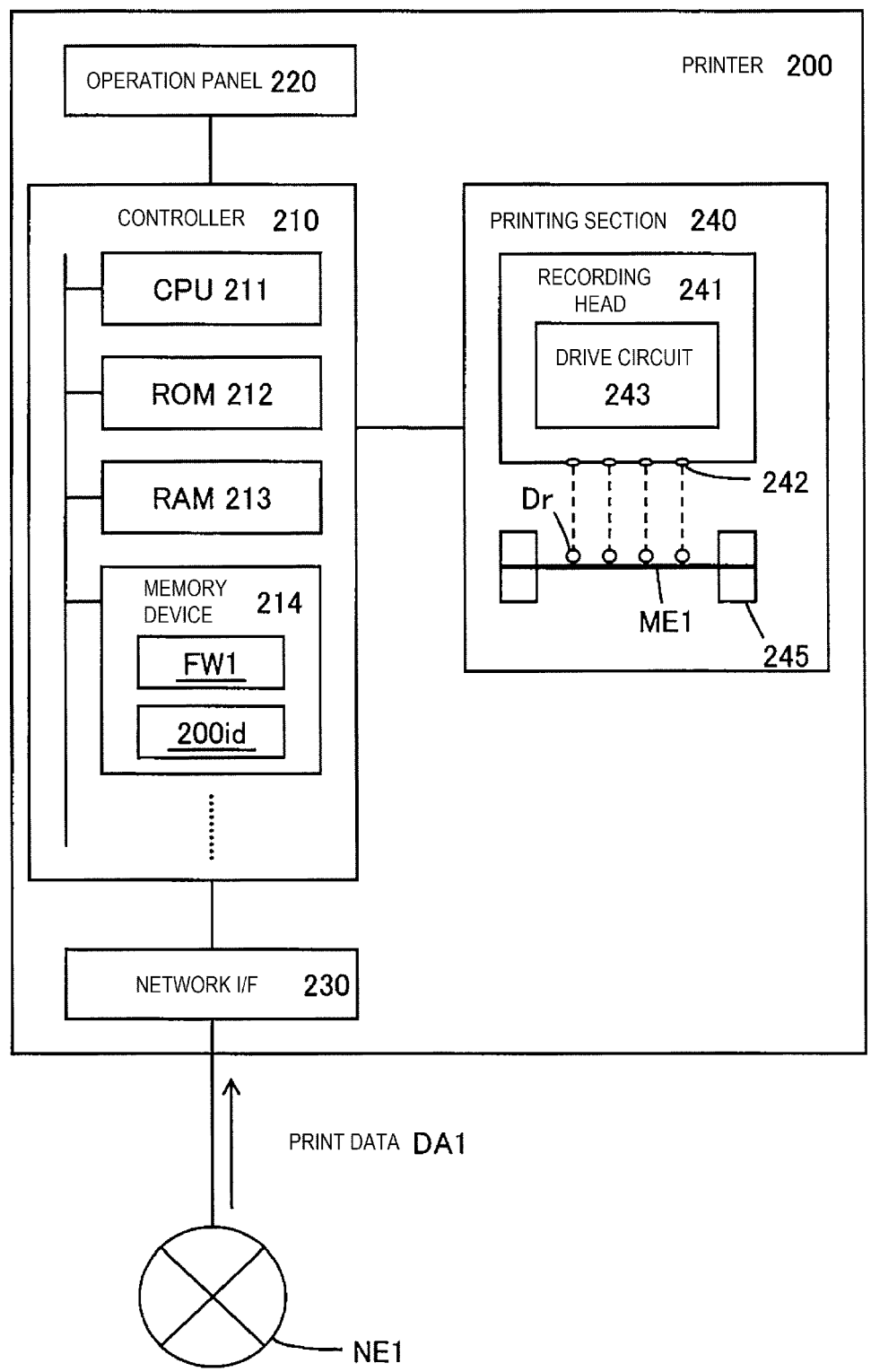
FIG. 6 is a block diagram schematically showing a configuration example of a printing apparatus.

FIG. 6 schematically exemplifies a configuration of the printer 200. The printer 200 shown in FIG. 6 is a printing apparatus that can execute printing of the contents CO1 according to the print data DA1 received via the network NE1. The printer 200 that can be used for the printing system SY1 is not particularly limited to, but includes an electrophotographic printer such as an inkjet printer or a laser printer. Obviously, the printer 200 may be a copy machine, a facsimile, a multifunction machine including these functions, or the like. FIG. 6 shows a configuration of the printer 200 as an inkjet printer.

The printer 200 shown in FIG. 6 includes a controller 210, an operation panel 220, a network I/F 230, and a printing section 240.

The controller 210 includes a CPU 211, a ROM 212, a RAM 213, a memory device 214, etc. These elements are electrically coupled and can input and output information to and from one another. That is, the printer 200 is a kind of computer. The memory device 214 stores firmware FW1 controlling the computer to function as the printer 200, printer identification information 200id for identification of the printer 200, etc. As the printer identification information 200id, a mail address, an IP address, a serial number, or the like may be used. Here, the IP address is an abbreviation for Internet Protocol Address. As the memory device 214, a nonvolatile semiconductor memory such as a flash memory, a magnetic storage device such as a hard disc, or the like may be used.

The operation panel 220 includes a display unit, an operation input unit, etc. and receives operations by the user. The display unit includes e.g. a liquid crystal panel and displays information representing the status of the printer 200, information representing an instruction by the user, etc. The operation input unit includes a plurality of operation keys including e.g. cursor keys and an enter key. Further, the operation input unit may be a touch panel receiving operations in a display window.

The network I/F 230 is connected to the network NE1 and communicates with another device connected to the network NE1 according to a predetermined communication standard.

The printing section 240 includes a recording head 241 ejecting droplets Dr as ink droplets to a print substrate ME1 and a paper feed unit 245 feeding the print substrate ME1. The recording head 241 has a plurality of nozzles 242 ejecting the droplets Dr and a drive circuit 243 injecting the droplets Dr from the respective nozzles 242. As the drive circuit 243, a circuit driving piezoelectric elements applying pressure to a liquid in pressure chambers communicating with the respective nozzles 242, a circuit driving thermal elements producing air bubbles in the liquid in the respective pressure chambers by heat, or the like may be used. The droplets Dr jump onto the print substrate ME1 fed by the paper feed unit 245, and thereby, the print image IM1 corresponding to the print data DA1 from the server 100 is formed on the print substrate ME1.

Note that the print substrate ME1 refers to a material holding the print image IM1. As the print substrate ME1, paper, resin, metal, or the like may be used. The shape of the print substrate ME1 is generally a rectangular shape or a roll shape, but may be a nearly circular shape like an optical disc, another polygonal shape than the rectangular shape, a solid shape, or the like.

Figure 7:
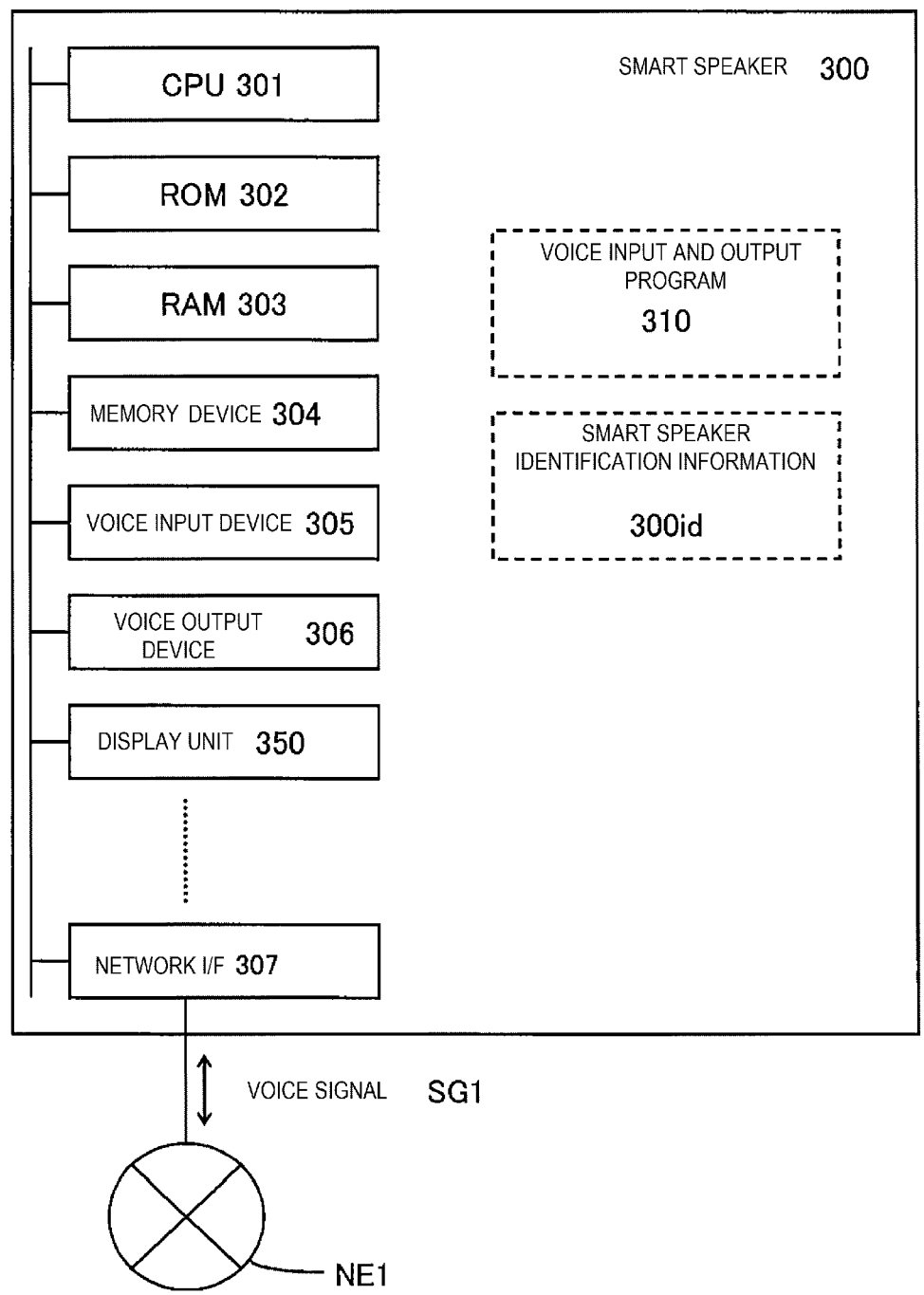
FIG. 7 is a block diagram schematically showing a configuration example of a voice input-output device.

FIG. 7 schematically exemplifies a configuration of the smart speaker 300 using the voice recognition service by the voice mediation device 400. The smart speaker 300 shown in FIG. 7 includes a CPU 301, a ROM 302, a RAM 303, a memory device 304, a voice input device 305, a voice output device 306, a network I/F 307, a display unit 350, etc. These elements are electrically coupled and can input and output information to and from one another. That is, the smart speaker 300 is a kind of computer. The memory device 304 stores a voice input and output program 310 controlling the computer to function as the smart speaker 300, smart speaker identification information 300id for identification of the smart speaker 300, etc. As the memory device 304, a nonvolatile semiconductor memory such as a flash memory, a magnetic storage device such as a hard disc, or the like may be used. The display unit 350 includes e.g. a liquid crystal panel and displays information representing the status of the smart speaker 300 etc.

Note that, in place of the smart speaker 300 including the display unit 350, a smart speaker without a display unit may be used.

The voice input device 305 includes a microphone and converts a voice entering from outside into an analog electrical signal by the microphone, and converts the electrical signal into a voice signal SG1. One or more voice input devices 305 may be provided in the smart speaker 300. The voice output device 306 includes a speaker in a narrow sense converting an electrical signal into sound, converts the digital voice signal SG1 into an analog electrical signal, converts the analog electrical signal into a voice by the speaker, and outputs the voice to the outside. One or more voice output devices 306 may be provided in the smart speaker 300. The network I/F 307 is connected to the network NE1 and communicates with another device connected to the network NE1 according to a predetermined communication standard.

The voice mediation device 400 shown in FIG. 1 is a server computer and includes e.g. a CPU, a ROM, a RAM, a memory device, an input device, a display device, a network I/F, etc.

The terminal 500 shown in FIG. 1 is used for an operation to register the printer 200 in the cloud print service. The terminal 500 may be used for an operation to register the smart speaker 300 in the voice mediation device 400. As the terminal 500, a portable terminal such as a smartphone or a tablet terminal, a personal computer, or the like may be used.

(3) SPECIFIC EXAMPLE OF PROCESSING OF SYSTEM

Figure 8:
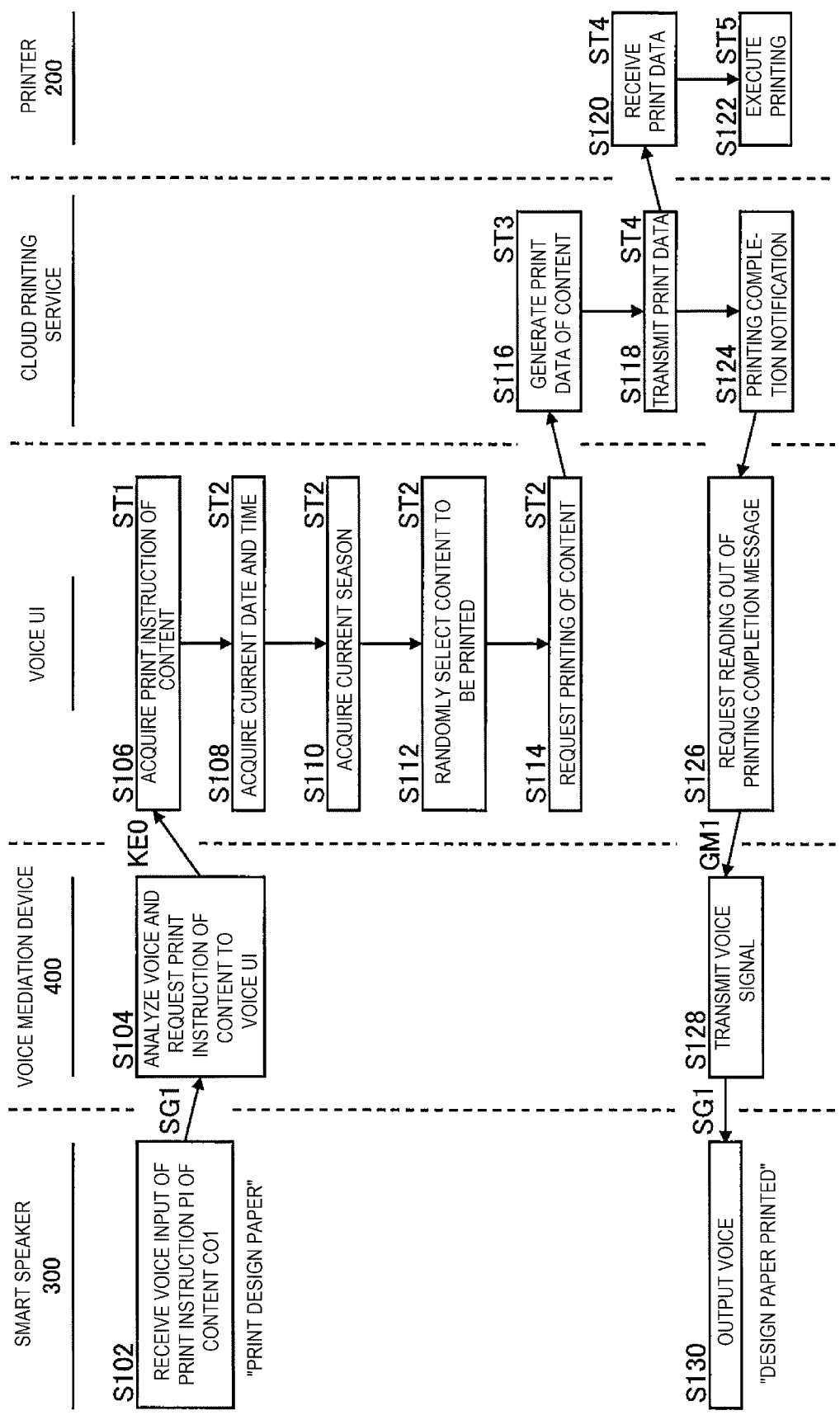
FIG. 8 schematically shows an example of processing of printing contents by voice input.

FIG. 8 schematically exemplifies processing of printing contents CO1 by voice input. As described above, "voice UI" refers to a part fulfilling the function of the voice UI of the server 100 and "cloud printing service" refers to a part fulfilling the function of the cloud printing service of the server 100. Here, step S106 corresponds to the print instruction acquisition step ST1, the print instruction acquisition unit 111, and the print instruction acquisition function FU1. Steps S108 to S114 correspond to the selection step ST2, the selection unit 112, and the selection function FU2. Step S116 corresponds to the print data generation step ST3. Steps S118 to S120 correspond to the print data transmission step ST4. Steps S116 to S118 are performed in the transmission unit 121 and correspond to the transmission function FU3. S122 corresponds to the printing step ST5. As below, the word "step" will be omitted and signs of the respective steps will be shown in brackets.

When the user US0 makes a speech of the print instruction PI of the content CO1 contained in the content group G1 to the smart speaker 300, the smart speaker 300 converts the voice from the user US0 into the voice signal SG1 and transmits the voice signal SG1 to the voice mediation device 400 (S102). For example, when the user US0 makes a speech "print design paper", the contents of the design paper contained in the content group G1 become objects of the print instruction PI.

The voice mediation device 400 receiving the voice signal SG1 acquires the identification information of the user US0, analyzes the voice based on the voice signal SG1, extracts the keyword KE0 from an analysis result of the voice, passes the keyword KE0 to the voice UI, and requests the print instruction PI (S104). The print instruction PI by the voice contains the keyword KE0. The print instruction PI may contain the keyword KE0 specifying the printer 200.

The voice mediation device 400 stores the identification information in the memory device with respect to each user US0 and stores the smart speaker identification information 300id associated to the identification information of the user US0. Accordingly, when the smart speaker 300 transmits the smart speaker identification information 300id, the voice mediation device 400 may acquire the identification information of the user US0 associated to the smart speaker identification information 300id.

Further, the voice mediation device 400 stores information representing features of the voice with respect to each user US0 in association with the identification information of the user US0 in the memory device. The features of the voice for identification of the user US0 are shown by e.g. a frequency distribution of the voice. Accordingly, the voice mediation device 400 may obtain the frequency distribution of the voice based on the voice signal SG1 and acquire the identification information of the user US0 associated to a frequency distribution closest to the frequency distribution from the memory device.

Furthermore, the smart speaker 300 may receive voice input of the name of the user US0 and the voice mediation device 400 may extract the name of the user US0 based on the voice signal SG1, and thereby, acquire the identification information of the user US0 associated to the name from the memory device.

The voice UI acquires the print instruction PI containing the keyword KE0, i.e., the print instruction PI of the content CO1 contained in the content group G1 from the voice mediation device 400 (S106). Further, the voice UI acquires the current date and time from the timepiece circuit 108 (S108). The acquired current date and time correspond to the time when the print instruction PI is acquired. After the acquisition of the current date and time, the voice UI acquires information representing the season corresponding to the current date and time (S110). For example, a value indicating spring is "1", a value indicating summer is "2", a value indicating fall is "3", and a value indicating winter is "4". The voice UI acquires "1" indicating spring when the current date and time show March to May, acquires "2" indicating summer when the current date and time show June to August, acquires "3" indicating fall when the current date and time show September to November, and acquires "4" indicating winter when the current date and time show December to February.

After the acquisition of the information representing the season, the voice UI randomly selects the content CO1 to be printed from the content group G1 so that the content CO1 may be selected with a probability obtained by multiplication by a weight set in the weight table TA1 shown in FIG. 3 (S112). As shown in FIG. 5, regarding the respective time-dependent contents CO2, the voice UI selects the content CO1 to be printed from the content group G1 to be selected with the selection probability SR dependent on the season in which the print instruction PI is acquired. Further, regarding the time-independent content CO3, the voice UI selects the content CO1 to be printed from the content group G1 to be selected with the selection probability SR independent of the season in which the print instruction PI is acquired.

For example, when the information representing the season indicates fall, the voice UI increases the weights of the probabilities for selection of the fall contents to "5" and decreases the weights of the probabilities for selection of the spring contents, the summer contents, and the winter contents to "0.2" according to the weight table TA1 shown in FIG. 3. Thereby, the first probability SR1 as the selection probability SR of the fall content is higher than the third probability SR3 as the selection probability SR of the neutral content, and the third probability SR3 is higher than the second probability SR2 as the selection probability SR of the spring content, the summer content, and the winter content. The voice UI selects the content CO1 to be printed from the content group G1 according to the selection probability SR applied to fall.

Obviously, when the information representing the season indicates winter, the voice UI increases the weights of the probabilities for selection of the winter contents to "5" and decreases the weights of the probabilities for selection of the other contents to "0.2". Thereby, the first probability SR1 as the selection probability SR of the winter content is higher than the third probability SR3 as the selection probability SR of the neutral content, and the third probability SR3 is higher than the second probability SR2 as the selection probability SR of the other time-dependent contents CO2. The voice UI selects the content CO1 to be printed from the content group G1 according to the selection probability SR applied to winter.

After the selection of the content CO1 to be printed, the voice UI requests printing of the selected content CO1 to the cloud printing service (S114).

The cloud printing service generates the print data DA1 using the content CO1 requested from the voice UI (S116). The print data DA1 is data for the printer 200 to print the requested content CO1. After the generation of the print data DA1, the cloud printing service performs processing of transmitting the print data DA1 to the printer 200 associated to user identification information UID via the network NE1 (S118).

In the above described manner, the transmission unit 121 of the server 100 transmits the print data DA1 for printing of the selected content CO1 to the printer 200.

The printer 200 receives the print data DA1 via the network NE1 (S120) and executes printing according to the print data DA1 (S122). Thereby, the contents CO1 selected with different probabilities according to the seasons in which the print instruction PI is acquired are printed.

Further, the cloud printing service transmitting the print data DA1 notifies the voice UI of the completion of the printing of the content CO1 (S124). The voice UI receiving the notification of the printing completion requests the voice mediation device 400 to read out a print completion message "something printed" with the name of the content CO1 as the guidance message GM1 (S126). The voice mediation device 400 receiving the guidance message GM1 converts the guidance message GM1 into the voice signal SG1 and transmits the voice signal SG1 to the smart speaker 300 via the network NE1 (S128). The smart speaker 300 receiving the voice signal SG1 converts the voice signal SG1 into a voice and outputs the voice (S130). Thereby, the user US0 may hear the voice saying that the content CO1 is printed. For example, when the content CO1 is design paper, a voice "design paper printed" is output from the smart speaker 300.

As described above, when the content CO1 is randomly selected and printed by the print instruction PI by a voice, the probability for selection of the content CO1 according to the season in which the print instruction PI is acquired is higher, and the contents CO1 more easily used are randomly printed. Therefore, the printing system SY1 has good usability.

(4) MODIFIED EXAMPLES

For the present disclosure, various modified examples are conceivable.

The voice input-output device to which the technique can be applied is not limited to the smart speaker 300, but may be a terminal such as a smartphone or a tablet, a personal computer, or the like.

The time for determination of the selection probability SR of the time-dependent content CO2 is not limited to the season, but may be on a half-year basis, a monthly basis, a daily basis, or the like.

All contents CO1 contained in the content group G1 may be the time-dependent contents CO2. Even when there is no time-independent content CO3 in the content group G1, the probability that the content CO1 to be printed is selected from the content group G1 changes according to the time when the print instruction PI is acquired, and the useability is increased.

The respective contents CO1 contained in the content group G1 may be named as proper names. Also, in this case, the server 100 selects the content CO1 to be printed from the content group G1 with the probability according to the time when the print instruction PI is acquired according to the print instruction PI of the name including a plurality of time-dependent contents CO2, and thereby, the technique is applied.

Figure 9:
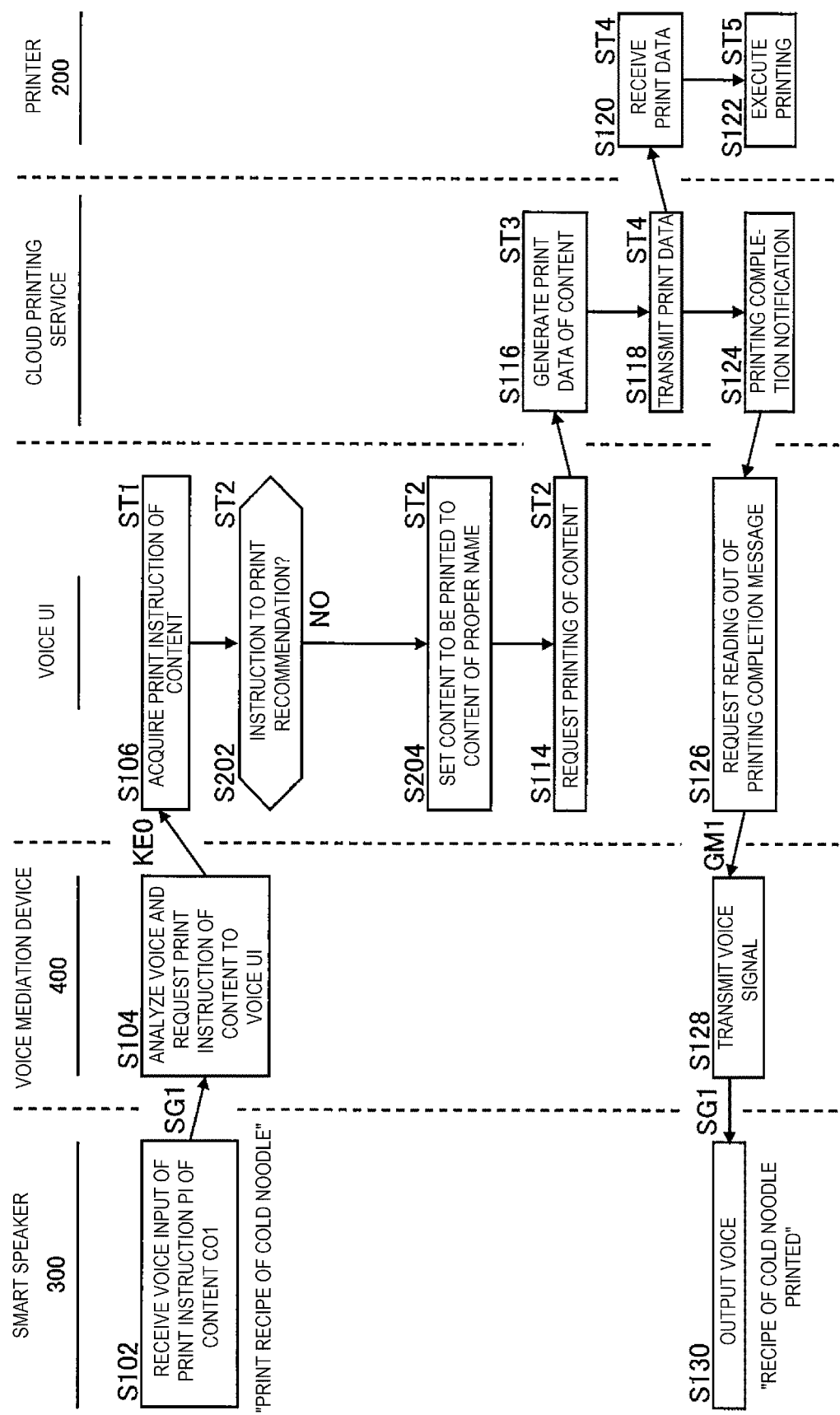
FIG. 9 schematically shows an example of processing of printing a specific content by voice input.

First, referring to FIG. 9, a flow of printing the content CO1 according to the print instruction PI containing the proper name of the content CO1 will be explained. FIG. 9 schematically exemplifies processing of printing the specific content CO1 by voice input. The print instruction PI shown in FIG. 9 is a print instruction not containing a selection instruction SI "recommended recipe" shown in FIG. 10 or the like. In the processing shown in FIG. 9, compared to the processing shown in FIGS. 8, S108 to S112 are replaced by S202 to S204. Here, S202 to S204 and S114 correspond to the selection step ST2, the selection unit 112, and the selection function FU2.

When the user US0 makes a speech of the print instruction PI of the specific content CO1 to the smart speaker 300, the smart speaker 300 converts the voice from the user US0 into the voice signal SG1 and transmits the signal to the voice mediation device 400 (S102). For example, when the user US0 makes a speech "print recipe of cold noodle", the content of the cold noodle contained in the content group G1 becomes an object of the print instruction PI. The voice mediation device 400 receiving the voice signal SG1 passes the keyword KE0 with the identification information of the user US0 to the voice UI and requests the print instruction PI (S104). The voice UI acquires the print instruction PI containing the keyword KE0, i.e., the print instruction PI of the specific content CO1 from the voice mediation device 400 (S106).

After the acquisition of the print instruction PI, the voice UI determines whether or not the print instruction PI is an instruction to print a recommendation (S202) and, when the print instruction PI is not an instruction to print a recommendation, moves the processing to S204. The instruction to print a recommendation refers to an instruction to print without specifying the content CO1 from the plurality of contents CO1 such that the print instruction PI is simply for "recipe", not "recipe of cold noodle", and the print instruction PI "print recommended recipe" exemplified in FIG. 10. Note that the processing when the print instruction PI is an instruction to print a recommendation will be described later.

When the print instruction PI is not an instruction to print a recommendation, the voice UI sets the content CO1 to be printed from the content group G1 to a content corresponding to the proper name (S204). For example, when the print instruction PI is an instruction to print the recipe of the cold noodle, the content of the recipe of the cold noodle is selected from the content group G1. After the selection of the content CO1 to be printed, the voice UI requests the cloud printing service to print the selected content CO1 (S114). Then, through the processing at S116 to S122, the selected content CO1 is printed. Further, through the processing at S124 to S130, a voice saying that the selected content CO1 is printed is output from the smart speaker 300. For example, when the content CO1 is the recipe of the cold noodle, a voice "recipe of cold noodle printed" is output from the smart speaker 300.

FIG. 10 schematically exemplifies processing of printing the recommended content CO1 by voice input. The print instruction PI shown in FIG. 10 is a print instruction containing the selection instruction SI. In the processing shown in FIG. 10, compared to the processing shown in FIG. 8, S202 is added between S106 and S108. Here, S202 and S108 to S114 correspond to the selection step ST2, the selection unit 112, and the selection function FU2.

When the user US0 makes a speech of the print instruction PI of the recommended content CO1 to the smart speaker 300, the smart speaker 300 converts the voice from the user US0 into the voice signal SG1 and transmits the signal to the voice mediation device 400 (S102). For example, when the user US0 makes a speech "print recommended recipe", the plurality of contents CO1 of the recipes contained in the content group G1 become objects of the print instruction PI. The plurality of contents CO1 contain at least a plurality of time-dependent contents CO2 and may contain the time-independent contents CO3. "Recommended recipe" is the selection instruction SI for the selection unit 112 to select the time-dependent content CO2 with the probability according to the time when the print instruction PI is acquired. The voice mediation device 400 receiving the voice signal SG1 passes the keyword KE0 with the identification information of the user US0 to the voice UI and requests the print instruction PI (S104). The voice UI acquires the print instruction PI containing the keyword KE0, i.e., the print instruction PI containing the selection instruction SI from the voice mediation device 400 (S106).

After the acquisition of the print instruction PI, the voice UI determines whether or not the print instruction PI is an instruction to print a recommendation (S202) and, when the print instruction PI is an instruction to print a recommendation, moves the processing to S108. In this case, the voice UI acquires the current date and time from the timepiece circuit 108 (S108), and acquires the information representing the season corresponding to the current date and time (S110). After the acquisition of the information representing the season, the voice UI randomly selects the content CO1 to be printed from the content group G1 so that the content CO1 may be selected with a probability obtained by multiplication by a weight set in the weight table TA1 shown in FIG. 3 (S112). As shown in FIG. 5, regarding the respective time-dependent contents CO2, the voice UI selects the content CO1 to be printed from the content group G1 to be selected with the selection probability SR according to the season in which the print instruction PI is acquired. For example, it is assumed that the summer contents contain the content of the recipe of the cold noodle. When the information representing the season indicates summer, the probability that the summer contents including the content of the recipe of the cold noodle is selected is higher than the probabilities for selection of the other contents than the summer contents. As a result, the summer contents including the content of the recipe of the cold noodle may be easily selected. Further, when the content group G1 contains the time-independent contents CO3, with respect to the time-independent contents CO3, the voice UI selects the content CO1 to be printed from the content group G1 to be selected with the selection probability SR independent of the season in which the print instruction PI is acquired.

After the selection of the content CO1 to be printed, the voice UI requests printing of the selected content CO1 to the cloud printing service (S114). Then, through the processing at S116 to S122, the selected content CO1 is printed. Further, through the processing at S124 to S130, a voice saying that the selected content CO1 is printed is output from the smart speaker 300. For example, when the content CO1 is the recipe of the cold noodle, a voice "recipe of cold noodle printed" is output from the smart speaker 300.

As described above, the probability for selection of the content CO1 changes according to the time when the print instruction PI is acquired by the print instruction PI containing the selection instruction SI to select the time-dependent content CO2 with the probability according to the time when the print instruction PI is acquired. Therefore, the examples shown in FIGS. 9 and 10 may further increase the useability.

(5) CONCLUSION

As described above, according to the present disclosure, the techniques of the printing system SY1, the server 100, etc. increasing usability may be provided by various embodiments. Obviously, the above described basic functions and effects may be obtained by the techniques only including the component elements according to the independent claims.

Further, configurations in which the respective configurations disclosed in the above described examples are replaced by one another or combinations thereof are changed, configurations in which the respective configurations disclosed in the known techniques and the above described examples are replaced by one another or combinations thereof are changed, etc. can be embodied. The present disclosure includes these configurations etc.

What is claimed is:

1. A printing system, comprising:
a printing apparatus; and
a server coupled to the printing apparatus via a network, the server including a central processing unit (CPU) configured to:
acquire a print instruction of a content contained in a content group by a voice from a voice mediation device,
select the content to be printed from the content group according to the print instruction, and
transmit print data for printing of the selected content to the printing apparatus, wherein
the content group contains:
a plurality of time-dependent contents having different probabilities for selection according to a time when the print instruction is acquired, and
a time-independent content having a probability for selection unchanged depending on the time when the print instruction is acquired,
the CPU:
selects the content to be printed from the content group so that each of the plurality of time-dependent contents is selected with a probability according to the time when the print instruction is acquired, selects the content to be printed from the content group so that the time-independent content is selected with the probability independent of the time when the print instruction is acquired, and
the printing apparatus is configured to receive the print data and execute printing according to the print data,
the print instruction specifies a type of content, and
the server selects the content to be printed from the content group according to the type of content included in the print instruction and the time when the print instruction is acquired.

2. The printing system according to claim 1, wherein the plurality of time-dependent contents have the different probabilities for selection depending on seasons in which the print instruction is acquired as the time, and the CPU is further configured to select the content to be printed from the content group so that each of the plurality of time-dependent contents is selected with the probability according to a season of the seasons when the print instruction is acquired.

3. The printing system according to claim 1, wherein a time-dependent content of the plurality of time-dependent contents is associated to a corresponding time having a first probability as the probability, and when the time when the print instruction is acquired is not the corresponding time, the probability that the time-dependent content is selected from the content group is a second probability lower than the first probability.

4. The printing system according to claim 1, wherein a time-dependent content of the plurality of time-dependent contents is associated to a corresponding time having a first probability as the probability, and when the time when the print instruction is acquired is not the corresponding time, the probability that the time-dependent content is selected from the content group is a second probability lower than the first probability, and the probability that the time-independent content is selected from the content group is lower than the first probability and higher than the second probability.

5. The printing system according to claim 1, wherein the print instruction contains a selection instruction to select a time-dependent content of the plurality of time-dependent contents with the probability according to the time when the print instruction is acquired, and when the CPU acquires the print instruction containing the selection instruction, the CPU is further configured to select the content to be printed from the content group so that each of the plurality of time-dependent contents is selected with the probability according to the time when the print instruction is acquired.

6. The printing system according to claim 1, wherein the server further includes a content memory unit storing the content group.

7. A server coupled to a printing apparatus executing printing according to received print data via a network, comprising:
a central processing unit (CPU) configured to:
acquire a print instruction of a content contained in a content group by a voice from a voice mediation device;
select the content to be printed from the content group according to the print instruction; and
transmit the print data for printing of the selected content to the printing apparatus, wherein
the content group contains:

a plurality of time-dependent contents having different probabilities for selection according to a time when the print instruction is acquired, and
a time-independent content having a probability for selection unchanged depending on the time when the print instruction is acquired, the CPU:

selects the content to be printed from the content group so that each of the plurality of time-dependent contents is selected with a probability according to the time when the print instruction is acquired, selects the content to be printed from the content group so that the time-independent content is selected with the probability independent of the time when the print instruction is acquired, the print instruction specifies a type of content, and the server selects the content to be printed from the content group according to the type of content included in the print instruction and the time when the print instruction is acquired.

\* \* \* \* \*